June 28, 1960     C. W. LYMAN     2,942,824
PALLET AND METHOD FOR MAKING SAME
Filed June 3, 1954     2 Sheets-Sheet 1
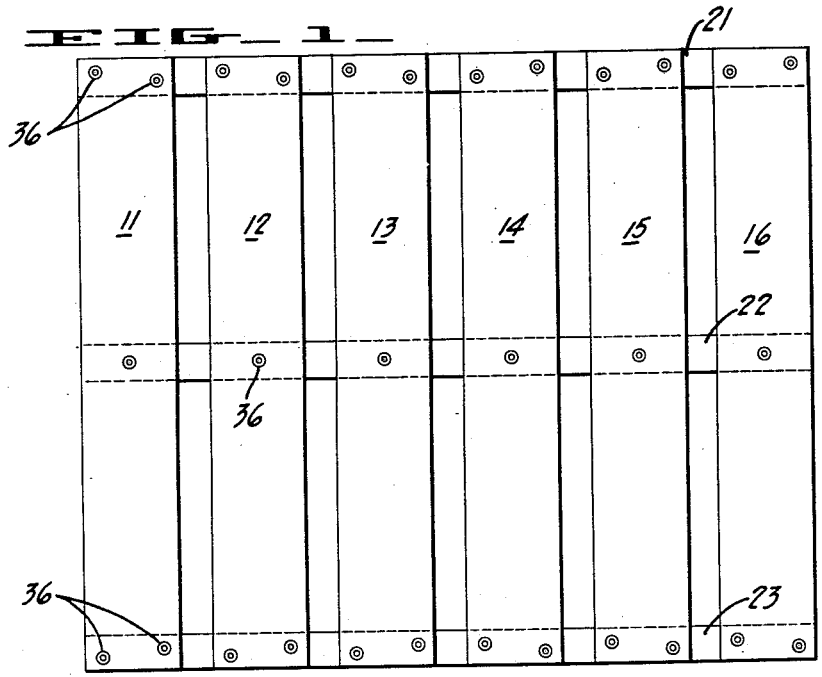
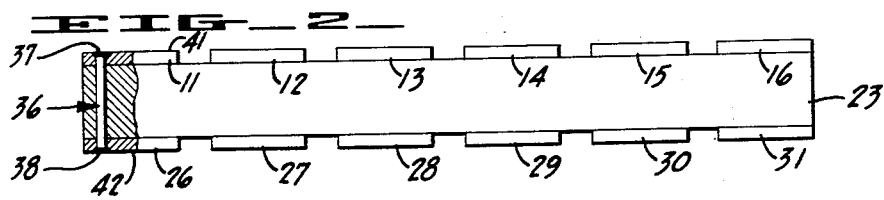
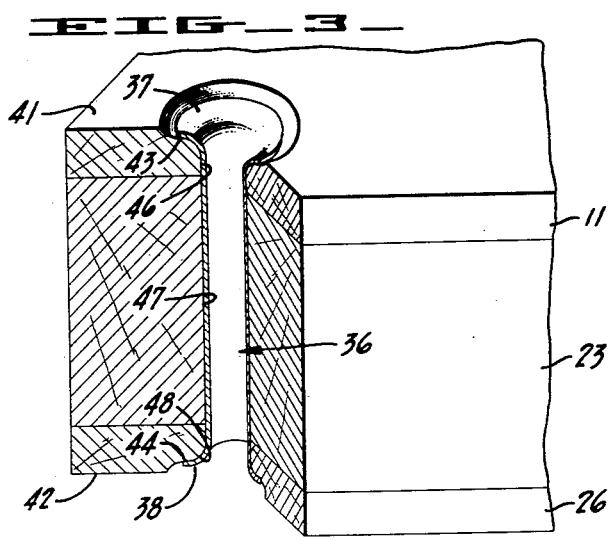
INVENTOR.
Claude W. Lyman June 28, 1960 C. W. LYMAN 2,942,824
PALLET AND METHOD FOR MAKING SAME
Filed June 3, 1954 2 Sheets-Sheet 2
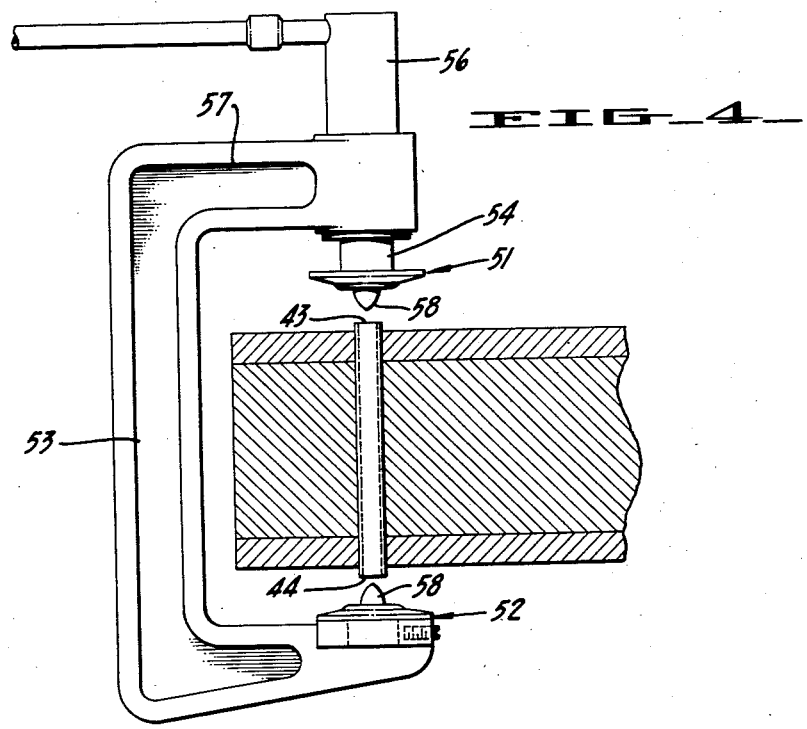
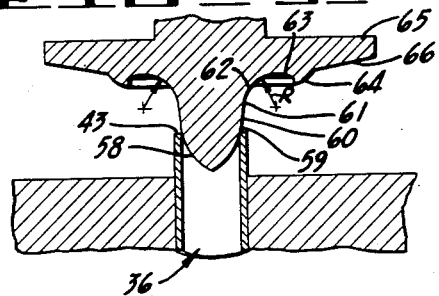
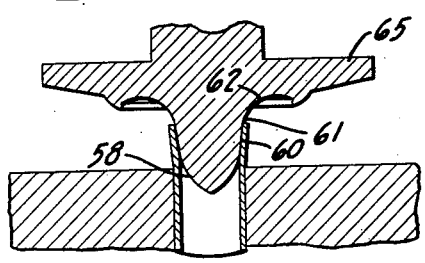
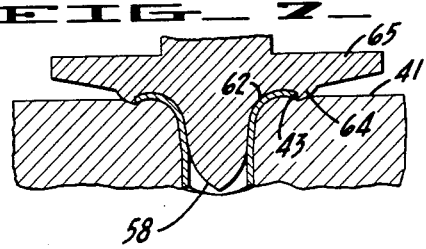
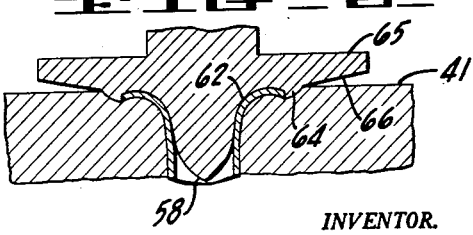
INVENTOR.
Claude W. Lyman
BY Manfred M. Warren
His Attorney

United States Patent Office 2,942,824
Patented June 28, 1960

2,942,824

PALLET AND METHOD FOR MAKING SAME

Claude W. Lyman, 288 Sunny Slope Road, Petaluma, Calif.

Filed June 3, 1954, Ser. No. 434,137

3 Claims. (Cl. 248—120)

The invention relates to wooden pallets, such as used in warehouses and various industrial plants and the like, and to the method and apparatus for fastening together the various frame and cross members which make up the pallet. This application is a continuation-in-part of my earlier application Serial No. 298,059, filed on or about July 10, 1952, for Apparatus and Method for Structural Fasteners, now abandoned.

Conventional pallets are usually made up of a framework of boards, which may be nailed or bolted together to provide a rigid platform upon which various articles, such as boxes, sacks, bales or the like, may be stacked for convenient storage or transportation, as by means of a forked lift truck. As will be understood, the requisite characteristics of pallets are strength, ruggedness and ability to withstand repeated use, overloading and reasonable abuse without breaking, splitting, coming apart or other premature failures.

An object of the present invention is to provide a pallet of the character described, which will be much stronger and considerably more rugged, and far more resistant to splitting or pulling apart of the wooden members, than either nailed or bolted pallets previously available.

Another object of the present invention is to provide a pallet of the character above, having a countersunk arrangement of the fastening elements, whereby the entire platform surface of the pallet will be smooth and uninterrupted, and free of upstanding obstructions of any kind, and wherein the fastening elements themselves are more securely anchored in place with less likelihood of projecting up from the platform after severe or prolonged use, to cause injury to the goods stacked or carried thereon.

A further object of the present invention is to provide a pallet of the character described in which the several joints thereof are compressibly secured under greater forces than obtainable with other types of fasteners to provide lasting tightness of the joints and to counteract for shrinkage of the wood.

Still another object of the present invention is to provide a pallet of the character described, which is adaptable to, and to provide a method and apparatus which will enable, low cost mass production of the pallets, with a minimum of manual labor and without the requirement of difficult or special skills.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 1 is a plan view of a pallet constructed in accordance with the present invention.

Figure 2 is an end elevation of the pallet with a portion thereof, including one of the fastener elements, shown in cross section.

Figure 3 is a fragmentary perspective view on an enlarged scale of the pallet, and showing one of the fastener elements in cross section.

Figure 4 is a side elevation of an apparatus constructed in accordance with the present invention for applying the fastener elements to the pallet.

Figure 5 is a fragmentary view showing one of the die members in side elevation and one end of the fastener element in cross section at one stage of the method of the present invention.

Figure 6 is a view similar to Figure 5, but taken at a second stage of the method.

Figure 7 is a view similar to Figures 5 and 6, but is taken at a third stage of the method.

Figure 8 is a view similar to Figures 5, 6 and 7, but is taken at a fourth stage of the method.

The pallet of the present invention is generally illustrated in Figures 1 to 3 of the accompanying drawings, and consists of a plurality of wooden boards 11, 12, 13, 14, 15 and 16, which are positioned upon cross or frame members 21, 22 and 23 in confronting relation to boards 26, 27, 28, 29, 30 and 31, positioned on the opposite sides of frame members 21, 22 and 23, the boards thus being arranged in intersecting and overlapping relation to provide a rectangular platform. In accordance with the present invention and as a principal feature thereof, these several boards are secured by a plurality of tubular metal fasteners 36, which are positioned through adjacent overlapping boards at their intersections and are each formed with outwardly flared opposite ends 37 and 38, which are compressively engaged against and countersunk into the opposite outside surfaces 41 and 42 of the platform boards, so as to provide substantially flush or below flush outside surfaces thereat. Cold drawn welded steel tubing may be used, although aluminum or other malleable metal may likewise be employed. Most practical tube sizes for pallets have been found to be 5/16 inch, 3/8 inch and 1/2 inch O.D., with wall thicknesses from 20 to 18 gauge. For most applications tubes of 3/8 inch O.D. and 20 gauge are suggested. In the pallet illustrated in Figures 1 and 2, such fasteners 36 may be used through the platform boards 11 to 16 and 26 to 31 assembled on opposite sides of outside frame boards 21 and 23 and an intermediate frame board 22. These fasteners are preferably secured under compression loads of approximately 4000 lb. per sq. inch, and thus provide firm and lasting tightness and ability to counteract subsequent wood shrinkage as may develop.

A common fault of both nailed and bolted pallets has been the splitting of the boards. In accordance with the present invention and as a principal feature thereof, the opposite end flared portions 37 and 38 are curled back upon the surfaces 41 and 42, and the ends 43 and 44 of the flared portions 37 and 38 are inserted into the wood so as to provide a metal reinforcement surrounding the aligned openings 46, 47 and 48 in the overlapping frame and platform boards for receiving the fastener 36 (see Figure 3). Preferably, the outside diameter of each of the tubes 36 is just slightly less than the internal diameter of the openings 46 to 48, so that the tube will have a fairly snug sliding fit in the openings. While the structural fastener, as illustrated in Figure 3 of the drawings, has a particularly valuable application to the construction of wooden pallets, it will be understood that the fastener may be otherwise used to provide structural connections between abutting overlapping wooden members and such use will, as more fully developed in my copending application above, provide greater shear strength, larger surface contact with less metal, improved economy of fastening, and other advantages.

The application of the fastening member 36 in place in the pallet members is accomplished by the apparatus and in accordance with the method of the present invention and as more specifically claimed in my divisional application Serial No. 516,353, filed June 20, 1955. The apparatus includes a pair of dies 51 and 52, which may be supported in opposed axially aligned position by a C-clamp yoke 53, which also supports the die member 51 for axial reciprocation to and from the fixed die 52. As here shown, the actuated die 51 is mounted at the end of a ram 54 of a hydraulic cylinder 56 carried by one arm 57 of the yoke. It will, however, be understood that other power or manually actuated means, such as a screw or toggle or the like, may be employed for displacement of the die 51. Each of the dies is formed with an end portion 58 of relatively reduced diameter adapted for insertion into the open end of the tube 36, and the two end portions of the two dies, as shown in Figure 4, are arranged in axially opposed confronting relation so as to enter simultaneously the opposite ends 43 and 44 of the tubes. The end portion 58 preferably widens out as at 59 to the inside diameter of the tube and merges with an adjacent frusto-conical portion 60, which diverges away from the end 58 so as to effect a flaring of the tube upon insertion into the tube end. The wider end 61 of the frusto-conical portion 60 terminates in an outwardly and arcuately curved portion 62, having a radius R as illustrated in Figure 5, and which functions to curl the tube end back upon the adjacent side of the wooden member. Surrounding the outer periphery 63 of the arcuately curved portion 62 is an annular shoulder 64, which projects from the surface of the portion 62 and which performs a pair of very important functions: one, to engage and stop the relative movement of the tube end and, two, to countersink the tube end into the adjacent wood surface. Preferably, also, a flange 65 surrounds the shoulder 64 to limit the embedding action of the shoulder into the wood. As here shown, the flange is provided with a face 66 contiguous with the shoulder 64 and which is beveled outwardly and away from the shoulder, so as to engage progressively the outer wood surface to effect the limiting action mentioned.

In accordance with the method and apparatus of the present invention, the two dies 51 and 52 are simultaneously inserted into the opposite tube ends 43 and 44 to accomplish a simultaneous flaring and curling operation, and this is made possible, at least in part, by the die form above described, which provides a series of successive self-equalizing actions. These are illustrated in the series of views Figures 5 through 8 of the drawings. The tube 36 preferably is cut so as to project approximately ⅛ inch from the opposite wood surfaces 41 and 42. The first step is to advance the die 51 toward die 52 so as to effect a simultaneous entry of the end portions 58 of each of the dies into the opposite tube ends, as illustrated in Figure 5. An automatic equalizing action takes place as the die part 59 reaches the end of the tube. On further approach of the dies, the tube ends will be simultaneously flared outwardly upon the frusto-conical portions 60, and a second equalizing action takes place at the ends 61 of such portions as the tube ends reach the arcuately curved portions 62. This position is illustrated in Figure 6 of the drawings. On further approach of the dies, a simultaneous reverse curling of the tube ends is effected upon the arcuately curved portions 62, and a third equalizing action takes place as the tube ends reach and engage the shoulders 64. This position of the parts is illustrated in Figure 7. Upon further approach of the dies, the shoulders 64 are embedded into the adjacent surfaces 41 and 42 of the wooden members so as to countersink the flared tube ends and to insert the tube ends back into the wood surfaces, as illustrated, to provide the reinforcement hereinabove described. A final equalizing action takes place as the beveled surfaces 66 of flanges 65 engage the opposite surfaces 41 and 42 so as to equalize the position of the tube in the pallet for equal countersinking of the tube ends. By reason of the foregoing, an even swaging or flaring and countersinking action at the opposite ends of the tube is effected in one operation.

As particularly shown in Figures 7 and 8, the shoulder 64 is made with a height (measured from the surface 63) equivalent to the wall thickness of tube 36, so that as the end of the tube is flared to abut against the shoulder 64, the outer surface of the tube forms a gently curved surface (facing downward in the figure) that is continuous with the outward peripheral surface of the base of shoulder 64. Consequently when the tube end and shoulder 64 are together countersunk into the surface 41, cutting of the wood fibers is avoided. The wood fibers are merely compressed within a bearing zone that is located beneath the tube end at the surface 41 and surrounding the bore 46, and the flared tube end bears against these compressed fibers of the bearing zone. The arrangement of the tube end is shown in Figure 3. Naturally, since the wood fibers are not severed, they extend integrally and continuously from within the bearing zone and peripherally outward therefrom to link with the other, uncompressed fibers of the member 11, and this arrangement enormously strengthens the pallet against splitting of the members at the points where the fasteners are applied.

If desired, a plurality of opposed sets of dies may be mounted in a press of suitable design for simultaneously effecting the flaring and countersinking of the opposite ends of a multiplicity of fastener elements. With such an arrangement, a complete pallet may be fabricated with one pass of the press.

I claim:

1. The method of fastening overlapping wooden members of a wooden pallet consisting in: drilling aligned cylindrical holes in said members to provide a continuous bore therethrough opening to the working platform surfaces of the pallet; inserting a section of metal tubing substantially filling said bore with the opposite ends of said tubing projecting through said openings at said working platform surfaces; and simultaneously compressing said wood and flaring said tube-ends, the wood being compressed in a zone surrounding each of said openings to form a ring of densified wood fibers displaced substantially below said working platform surface, with said fibers extending integrally and continuously from within said ring and peripherally outwardly therefrom and the tube-ends being flared to curl part-way around said rings below said working platform surfaces.

2. A pallet comprising a plurality of overlapping fibrous wooden members including outer members defining a pair of opposite outside working surfaces for said pallet, the overlapping portions of said members having axially aligned bores formed therethrough and opening to said working surfaces; and a plurality of metal tubes disposed in said bores, the ends of said tubes being flared outwardly and curled back engaging said outer members substantially below said working surfaces thereof, the wood fibers of said outer members being compressed beneath the flared portions of said tubes and extending integrally and continuously from beneath said flared portions.

3. A pallet comprising a plurality of overlapping fibrous wooden members including outer members defining a pair of opposite outside working surfaces for said pallet, the overlapping portions of said members having axially aligned bores formed therethrough and opening to said working surfaces, said outer members having bearing zones surrounding said bores at said working surfaces thereof, and the wooden fibers of said outer members being compressed within said bearing zones substantially below the planes of said working surfaces, said fibers extending integrally and continuously from within said bearing zones and peripherally outwardly therefrom; and a plurality of metal tubes disposed in said bores, the ends of said tubes being flared outwardly and curled back engaging the bearing zone portions of said outer members below said working surfaces thereof for holding said members in assembled relation.

References Cited in the file of this patent

UNITED STATES PATENTS

| | | |
|---|---|---|
| 204,476 | Bourne | June 4, 1878 |
| 277,076 | Stuart | May 8, 1883 |
| 429,578 | Niedringhaus | June 3, 1890 |
| 713,679 | Pfeil et al. | Nov. 18, 1902 |
| 778,924 | Umsted | Jan. 3, 1905 |
| 1,122,280 | Kempshall | Dec. 29, 1914 |
| 1,327,033 | Gookin | Jan. 6, 1920 |
| 1,976,776 | Gookin | Oct. 16, 1934 |
| 2,228,930 | Robinson | Jan. 14, 1941 |
| 2,371,878 | Cruickshank | Mar. 20, 1945 |
| 2,393,984 | Gookin | Feb. 5, 1946 |
| 2,486,284 | Horwitz | Oct. 25, 1949 |
| 2,491,073 | Barrett | Dec. 13, 1949 |
| 2,570,048 | Cooke et al. | Oct. 2, 1951 |
| 2,638,637 | Kump | May 19, 1953 |
| 2,783,960 | Herz et al. | Mar. 5, 1957 |

FOREIGN PATENTS

| | | |
|---|---|---|
| 8,177 | Netherlands | Apr. 16, 1923 |
| 103,770 | Austria | July 26, 1926 |